United States Patent [19]

Warren et al.

[11] Patent Number: 4,847,115

[45] Date of Patent: Jul. 11, 1989

[54] CHEMICAL SYNTHESIS OF CONDUCTING POLYPYRROLE USING UNIFORM OXIDANT/DOPANT REAGENTS

[75] Inventors: Leslie F. Warren, Camarillo; Dennis R. Strauss, Ventura, both of Calif.

[73] Assignee: Rockwell International Corporation, El Segundo, Calif.

[21] Appl. No.: 83,126

[22] Filed: Aug. 10, 1987

[51] Int. Cl.$^4$ .......................... B05D 5/12; H01B 1/06
[52] U.S. Cl. .................................. 427/121; 427/301;
427/302; 427/407.1; 427/407.2; 427/407.3;
427/412; 427/412.5; 427/419.8; 526/258;
528/423; 252/500; 252/518; 252/519
[58] Field of Search ............... 252/500, 519, 512, 518;
528/423; 526/258; 556/111, 1, 139; 427/121,
126.1, 301, 302, 407.1, 407.2, 407.3, 412, 412.5,
419.8

[56] References Cited

U.S. PATENT DOCUMENTS

| | | | |
|---|---|---|---|
| 4,567,250 | 1/1986 | Narmunn et al. | 528/423 |
| 4,585,695 | 4/1986 | Igasawara et al. | 252/500 X |
| 4,697,001 | 9/1987 | Walker et al. | 252/500 |

*Primary Examiner*—Josephine Barr
*Attorney, Agent, or Firm*—Charles T. Silberberg; Max Geldin

[57] ABSTRACT

A method for producing oxidant/dopant reagent solutions which comprises reacting a basic ferric carboxylate, preferably basic ferric acetate, with an alkyl or aryl sulfonic acid, e.g., benzenesulfonic acid, to produce the corresponding ferric sulfonate in solution. Oxidant/dopant solutions can also be prepared containing cupric or ceric sulfonates. The oxidant/dopant solution is employed in situ for reaction with a pyrrole to produce electrically conductive polypyrrole. A porous substrate, such as fiberglass cloth, can be dipped in the oxidant/dopant solution, dried and then treated with a pyrrole to produce an electrically conductive polypyrrole deposit in the interstices of the substrate.

32 Claims, No Drawings

CHEMICAL SYNTHESIS OF CONDUCTING POLYPYRROLE USING UNIFORM OXIDANT/DOPANT REAGENTS

BACKGROUND OF THE INVENTION

The present invention relates to the production of electrically conductive polypyrrole and is particularly concerned with a process for producing consistent quality oxidant/dopant reagents for converting pyrrole to stable polypyrrole material.

Polypyrrole represents one of the most environmentally stable conducting organic polymers. Its usual preparation has involved electrochemical oxidation of pyrroles in various solvents, with films of the conducting materials depositing on the anode. U.S. Pat. Nos. 4,552,927 to L. F. Warren and 4,582,575 to L. F. Warren, et al, are illustrative of the production of conductive polypyrrole produced in thicker layers and having improved mechanical properties, such as flexibility, as compared to prior art electrochemically produced polypyrrole films.

Chemically prepared polypyrrole has several distinct advantages over electrochemically prepared polypyrrole, especially concerning its potential use commercially. Thus, chemically prepared polypyrrole is much more amenable to scale-up and commercial plant equipment. It also is considerably easier to apply to a substrate or structural material which would then be used in fabricating an end product.

The presently preferred art of preparing conductive polypyrrolye materials chemically, e.g., in the form of powders, films and composites, involves reaction of a pyrrole monomer with salts, e.g., the ferric salts, of the dopant anion to be incorporated in the polymer. However, the dopant anions from suitable commercially available ferric salts, such as the chloride, sulfate, nitrate and perchlorate, often impart inferior physical properties, such as low conductivities and thermal instability to the polypyrrole deposits.

A chemical process for producing conductive polypyrrole having improved conductivity and thermal stability is disclosed in U.S. application Ser. No. 916,917 filed Oct. 9, 1986, of John A. Walker, Edward F. Witucki and Leslie F. Warren, now U.S. Pat. No. 4,697,001, and assigned to the same assignee as the present application. In this patent, a liquid pyrrole is treated with a solution of a strong oxidant/dopant, e.g., ferric alkyl or aryl sulfonate. The preparation of ferric alkyl and aryl sulfonate salts is presently carried out by the reaction of freshly precipitated ferric hydroxide with the corresponding sulfonic acid in aqueous or non-aqueous media, followed by isolation and purification of the resulting ferric sulfonate salts.

However, isolation and purification of the resulting ferric salts are usually very difficult due to their high solubilities, the presence of impurities, both organic and inorganic, and the varying degree of solvation of the ferric ions. The impure solids isolated by evaporation of the solvents from these reactions are typically used as is for reaction with pyrrole to form polypyrrole, with inconsistent results.

An object of the present invention is the preparation of uniform oxidant/dopant reagents for conductive polymer preparation.

Another object is to provide a simplified procedure for the preparation of oxidant/dopant solutions which can be employed in situ for polymerizing a pyrrole to conductive polypyrrole, without isolation and purification of the oxidant/dopant salt.

Yet another object is the provision of procedure as noted above for production of oxidant sulfonate salts, particularly ferric sulfonates, in the form of reagent solutions, which can be employed directly for reaction with pyrrole to produce stable conductive polypyrrole materials of consistent good quality.

SUMMARY OF THE INVENTION

The above objects are achieved, according to the invention, and a convenient in situ procedure for preparing consistent quality oxidant/dopant, e.g., ferric sulfonate, reagent solutions for pyrrole polymerization developed, involving the reaction of certain basic metal carboxylates, particularly basic ferric acetate, with an effective amount, preferably a stoichiometric amount, of an alkyl or aryl sulfonic acid in a suitable solvent.

The resulting oxidant/dopant reagent solutions containing sulfonate salt can be employed directly for reaction with a pyrrole for polymerizing the pyrrole to conductive polypyrrole.

Alternatively, a porous substrate, such as fiberglass fabric, can be treated as by dipping in the oxidant/dopant reagent solution, such as the reaction medium containing sulfonate salt, e.g., ferric sulfonate, followed by drying. The dried substrate can then be treated with a liquid pyrrole to polymerize the pyrrole and form a conductive polypyrrole on the substrate.

The oxidant/dopant reagent solutions, such as the ferric sulfonate reagent solutions produced according to the invention, function exactly as do solutions of the pure oxidant salt, e.g., the pure ferric sulfonate, employed in the process of the above application, Ser. No. 916,917, for reaction with pyrrole to produce polypyrrole, with no apparent interference by any remaining carboxylic acid, while affording additional advantages.

Thus, the invention provides a convenient method for preparing consistent quality sulfonate salt, e.g., ferric sulfonate, oxidant/dopant reagent solutions for pyrrole polymerization, which not only omits the step of crystallizing out the sulfonate salt, e.g., ferric sulfonate, but produces higher quality polypyrrole deposits of more consistent conductivity characteristics.

These and other objects and features of the invention will become apparent from the following detailed description thereof.

DETAILED DESCRIPTION OF THE INVENTION AND THE PREFERRED EMBODIMENTS

The oxidation of pyrrole or a substituted derivative thereof to produce the conductive pyrrole polymer is carried out in the presence of a strong oxidant and a non-nucleophilic anion functioning as dopant anion for the pyrrole polymer. The term "strong oxidant" as employed herein is intended to denote any oxidizing substance which is capable of oxidizing pyrrole or a substituted derivative thereof to produce polypyrrole or a pyrrole copolymer. Examples of strong oxidants include the cations $Fe^{3+}$, $Cu^{2+}$ and $Ce^{4+}$. The dopant anions are organic anions, particularly alkyl or aryl sulfonates. The alkyl sulfonates can contain alkyl groups of from 1 to about 18 carbon atoms, and such alkyl groups can be unsubstituted or substituted, e.g., by halogen, such as chlorine or fluorine atoms, or by nitro groups. The aryl groups can be benzene, naphthalene and the like, and such aryl groups can be unsubstituted or substituted, e.g., by alkyl groups, such as methyl, ethyl and the like.

A convenient manner for providing both the strong oxidant and dopant anion is in the form of a salt incorporating both the oxidant cation and the dopant anion as oxidant counterion.

The preferred oxidant/dopant reagent for purposes of the present invention accordingly are the ferric, cupric and ceric alkyl and aryl sulfonates.

For production of the improved oxidant/dopant reagent solutions according to the invention, basic ferric carboxylates are reacted with the desired sulfonic acid. A preferred basic ferric carboxylate is basic verric acetate. Other basic ferric carboxylates which can be employed are, for example, basic ferric formate, propionate, butyrate and benzoate. These specific carboxylates are commercially available. However, such carboxylates, for example, basic ferric acetate, can be prepared by the reaction of ferric hydroxide and acetic acid by known procedure and recrystallized from acetic acid.

Alternatively, basic cupric and ceric carboxylates, such as the formate, propionate, butyrate and benzoate, can be employed. However, since the preferred metal carboxylate is the preferred basic ferric carboxylate and particularly basic ferric acetate, the invention will be described primarily in terms of the use of the latter material.

The reaction procedure for producing the oxidant-/dopant reagent solutions of the invention involves the reaction of the basic ferric carboxylates, typically of the type $[Fe_3O(O_2CR)_6(H_2O)_3]^+RCO_2^-$, with a stoichiometric amount (9 equivalents), or 3 equivalents per iron atom, of the desired sulfonic acid in a suitable solvent. Ferric carboxylates have been shown to have the cation formulation $[Fe_3O(O_2CR)_6(H_2O)_3]^+$; with the acetate described herein, $R=CH_3$ and the anion is acetate. See Cotton and Wilkinson, "Advanced Inorganic Chemistry", 4th Edition, Wiley/Interscience, 1980. The general reaction is as follows:

$$[Fe_3O(O_2CR)_6(H_2O)_3]^+RCO_2^- + 9\ R'SO_3H \rightarrow 3\ Fe(O_3SR')_3 + 7\ RCO_2H + 4\ H_2O$$

where R,R' = alkyl or aryl functionalities.

Examples of sulfonic acids which can be employed in the above reaction, within the definition of the alkyl and aryl sulfonic acids noted above are benzenesulfonic acid 4-ethylbenzenesulfonic acid, 4-chlorobenzenesulfonic acid, dodecylbenzenesulfonic acid, methylsulfonic acid, perfluorooctylsulfonic acid, 4-methylbenzenesulfonic acid, and 2-naphthalenesulfonic acid.

In the above reaction employing stoichiometric proportions of the sulfonic acid to the ferric carboxylate corresponding to 9 equivalents of such acid, a sulfonate salt is obtained with 3 monoanion fuctionalities present on each Fe atom. The reaction is generally carried out in a suitable solvent in which the sulfonate salt product, e.g., ferric sulfonate, is soluble, and which can be an organic solvent, such as methanol, ethanol, acetonitrile, dioxane, tetrahydrofuran (THF) and acetone. Water, alone or in combination with a water miscible or immiscible solvent, also can be employed. The reaction can be carried out at a temperature ranging from about ambient or room temperature up to about 40° C. and is typically carried out at warm temperatures of about 40° C. with stirring in the solvent medium.

The oxidant/dopant reagent solution containing dissolved basic ferric sulfonate, e.g., basic ferric 4-ethylbenzenesulfonate, is reacted in situ with a pyrrole for oxidation and polymerization of the pyrrole to polypyrrole.

The pyrrole treating solution can comprise as pyrrole monomer neat liquid pyrrole, a C-substituted pyrrole, such as a 3- or 3,4- alkyl or aryl substituted pyrrole, e.g., 3-methylpyrrole, 3,4-dimethylpyrrole, 3-phenylpyrrole or 3-methyl-4-phenylpyrrole, an N-substituted pyrrole, e.g., an N-alkylpyrrole, such as N-methylpyrrole, or an N-arylpyrrole, such as N-phenylpyrrole, or a substituted N-phenylpyrrole, such as nitrophenylpyrrole, to obtain the corresponding conductive pyrrole homopolymer. For production of a conductive copolymer, a mixture of pyrrole and a C- or an N-substituted derivative of pyrrole, as described above, can be employed. The use of substituted pyrroles generally results in lower conductivity polymers than the parent polypyrrole. Hence, the use of pyrrole is preferred for higher conductivity applications.

The reaction is carried out in the solvent contained in the oxidant/dopant reagent solution, e.g., methanol, or any other suitable solvent can be added.

The concentration of the oxidant/dopant in the reaction mixture containing the pyrrole can range from about 0.01 to about 2 molar, e.g., about 1 molar.

The concentration of the pyrrole in the reaction mixture can vary but generally is in the range from about 0.01 to 2 molar.

The reaction is conveniently carried out by slowly adding the pyrrole, e.g., dropwise, to the oxidant/dopant reagent solution with stirring. The pyrrole can be a liquid pyrrole, such as a neat pyrrole, or a solution of a pyrrole in a suitable solvent. A black precipitate forms almost immediately and continues to form until addition of the pyrrole is complete. The reaction mixture is then stirred for a period of time, e.g., for 15 minutes or more, to assure completeness of reaction.

The reaction mixture is then filtered and the solid washed, e.g., with water and/or methanol. The dry polypyrrole powder is comprised of a pyrrole polymer cation and one of the above sulfonate anions as dopant. Elemental analysis obtained on these polymers indicate approximately 1 anion for about 2 to 7 pyrrole units, with an average dopant concentration of about 1 anion for each 3 to 4 pyrrole units. The conductivity of the polypyrrole-sulfonate counterion solids can range from about $10^{-3}$ to about 200 (ohm-cm)$^{-1}$.

The invention process affords a convenient method for preparing consistent quality oxidant/dopant, e.g., ferric sulfonate, reagent solutions, for production of stable conductive polypyrrole materials of good conductivity and uniform quality.

The oxidant/dopant reagent solutions produced according to the invention function in the same manner as solutions of the pure ferric sulfonate according to the process of the above U.S. Pat. No. 4,697,001, with no apparent interference by any carboxylic acid remaining in the reagent solution, since the carboxylic acid is a weak acid and as such will not be incorporated as a dopant anion into the polypyrrole deposits during pyrrole polymerization. Since both the carboxylates, e.g., the basic ferric carboxylates, and the sulfonic acids employed in the invention process are readily available in a pure form, the resulting reagent solutions containing the in situ formed sulfonate salt, such as ferric sulfonate, are consistent from run to run.

Electrically conductive composites containing electrically conductive polypyrrole produced according to the invention can also be prepared by impregnating a porous substrate, such as a fabric, e.g., fiberglass fabric, with a conductive polypyrrole material produced according to the invention. In such process, a porous dielectric or electric insulating material can be used as substrate, such as a porous ceramic, a porous glass, e.g., a frit, a porous organic foam, e.g., polyurethane, a fabric, which can be woven or non-woven, e.g., fiberglass fabric, a mixed oxide fabric, such as an alumina-silica-boria fabric, e.g., Nextel, or a synthetic organic fabric, such as Kevlar, a trademark of the DuPont Company for aromatic polyamide fiber, a polyester, such as Dacron cloth, and the like.

Such conductive polypyrrole composites can be produced by contacting the dielectric porous substance, e.g., as by dipping the porous substance into an oxidant/dopant solution produced according to the invention, and drying the so-treated porous substance. Thereafter, the substrate is treated with a pyrrole. The pyrrole can comprise pyrrole or a C-substituted pyrrole, as noted above. Such pyrrole materials may be a liquid pyrrole, such as a neat pyrrole, or a pyrrole in vapor form. The pyrrole may be contained in a solvent, such as cyclohexane, alcohols, dioxane and acetonitrile. Water also can be employed.

The time of treatment of the porous substrate in the oxidant/dopant solution and the pyrrole is long enough to penetrate the interstices of the porous material with the oxidant/dopant solution and to obtain sufficient penetration of a pyrrole therein, to permit the precipitation reaction to occur in the interstices. The polypyrrole which is thus chemically precipitated remains within the interstices of the dielectric porous material after washing or rinsing thereof, e.g., with a solvent such as methanol or acetone, followed by drying thereof. Sheet resistivities for the resulting polypyrrole/porous substrates can range from 10 to about 10,000 ohms/square. The term "ohms/square" is defined as the bulk resistivity of the sample in ohms×cm divided by the thickness in cm. Sheet resistivity is proportional to the reciprocal of electrical conductivity.

If desired, the porous substrate can be treated first with the liquid pyrrole and dried, followed by treatment of the substrate containing the liquid pyrrole in the interstices thereof, with the oxidant/dopant solution.

The porous substrate can be subjected to a plurality of coating cycles, e.g., 2 or 3 coating cycles, to produce a thicker coating of enhanced electrical conductivity.

The following are examples of practice of the invention:

EXAMPLE 1

A. A PREPARATION OF FERRIC HYDROXIDE

Sixty g of ferric chloride hexahydrate dissolved in 3 l of water were treated with 3 equivalents, 27 g, of NaOH in 1 l of water. The mixture was stirred for 30 minutes and let stand for one hour. The supernatant liquid was carefully siphoned out and replaced (to 4 l) with fresh water. This stirring, settling, and siphoning was repeated two more times to remove most of the sodium chloride by-product. The ferric hydroxide precipitate was then filtered in a 2 l medium-frit sintered glass filter funnel. The funnel with the still moist ferric hydroxide was placed in a freezer overnight until the water in the material froze. This process serves to convert the precipitate from a gummy mass into a granular form which is much more easily handled. The material was allowed to thaw, rinsed with fresh water, and air-dried to near dryness in the filter funnel.

B. PREPARATION OF BASIC FERRIC ACETATE

The ferric hydroxide solid was dissolved in 200 ml of glacial acetic acid, and the resulting solution reduced to dryness at 40° C. with a water aspirator rotary evaporator. 30 ml of 10% acetic acid was added to the residue, followed by 50 ml of water, and stirred until a clear solution was obtained. The solution was poured into a large evaporating dish and placed in a fume hood to evaporate the solvent at room temperature. After a few days, the goopy mass was stirred for 5 minutes with 100 ml of 10% acetic acid, and the fine pale orange solid which separated was filtered (using a fine frit sintered glass filter funnel). The nearly dry solid was then rinsed with isopropanol and air-dried. The combined filtrates were evaporated as before in the fume hood, treated with 10% acetic acid, and filtered to recover more ferric acetate. This process was repeated until no more solid formed with the dilute acid treatment. Total yield, 41 g, about 85%. The ferric acetate was stored at room temperature in a sealed bottle.

Preparation of Ferric Trichlorobenzenesulfonate and Solid Polypyrrole-Trichlorobenzenesulfonate 3.64 g (16.8 mmol) of ferric acetate and 13.2 g (50.4 mmol) of 2,4,5-trichlorobenzenesulfonic acid were treated with 10 ml of methanol and the mixture containing ferric trichlorobenzenesulfonate stirred until all solids had dissolved.

To this solution was added 0.5 g (7.5 mmol) of neat pyrrole, and the mixture was stirred with a magnetic stir bar. The mixture thickened considerably, and it was diluted with enough methanol to just break up the solid mass. After 30 minutes, the black precipitate was filtered and washed with dilute HCl, followed by methanol and acetone and air-drying. Yield, about 80%, based on pyrrole. Four-point conductivity probe measurement on a pressed pellet (10 tons pressure) of the polymer was 43.6 (ohm-cm)$^{-1}$.

EXAMPLE 2

Preparation of Polypyrrole Coatings On Fiberglass Fabric Via Ferric Acetate Route 6.0 g (9.2 mmol) of basic ferric acetate was dissolved in 50 ml of methanol. 15.4 g (82.9 mmol) of ethylbenzenesulfonic acid (EBS) was added to the solution. The solution was stirred until the EBS dissolved. The solution was diluted with methanol to give 100 ml total volume.

A 4"×4" coupon of woven fiberglass fabric was soaked in the solution, removed and hung in the air until dry to the touch.

The coated fabric was then soaked in a 3% solution of pyrrole in cyclohexane for 5 minutes while stirred. The fabric was then removed and air-dried. The coupon was then washed with methanol until the washings were clear and then air-dried again.

The surface resistivity of the resulting polypyrrole coating doped with ethylbenzenesulfonate was measured with a square two-electrode probe. The average value measured was 1050 ohms/square.

EXAMPLE 3

Polypyrrole coatings doped with other sulfonates were prepared by the procedure of Example 2, substituting, respectively, dodecylbenzenesulfonic acid, benzenesulfonic acid and p-chlorobenzenesulfonic acid, in each case, for ethylbenzenesulfonic acid.

Surface resistivities of polypyrrole coatings doped with such other sulfonates are as follows:

Dodecylbenzenesulfonate (DDBS)-doped: 250 ohms/square; after two coating cycles: 140 ohms/square;

Benzenesulfonate (BS)-doped: 1750 ohms/square;

4-chlorobenzenesulfonate (CBS)-doped: 2650 ohms/square; after two coating cycles: 500 ohms/square.

The conductive plypyrrole materials produced according to the invention have application as conductive composite structural materials, semi-conductor components, in anti-static applications, in electromagnetic interference shielding applications, and as electrical conductors.

From the foregoing, it is seen that the present invention provides improved chemical procedure for preparing novel oxidant/dopant reagent solutions of consistent quality, which can be employed in situ for reaction with a pyrrole to produce stable electrically conductive polypyrrole deposits having good thermal stability and good quality.

Since various changes and modifications will occur to and can be made readily by those skilled in the art without departing from the invention concept, the invention is not to be taken as limited except by the scope of the appended claims.

What is claimed is:

1. In the process for producing conductive polypyrrole by reaction of pyrrole and an oxidant/dopant, the improvement which comprises producing said oxidant/dopant by reaction of a basic metal carboxylate selected from the group consisting of basic ferric, cupric and ceric carboxylates, with an effective amount of a sulfonic acid selected from the group consisting of alkyl and aryl sulfonic acids, and recovering an oxidant/dopant reagent solution containing the corresponding metal sulfonate as the oxidant/dopant.

2. The process of claim 1, employing a stoichiometric amount of said sulfonic acid, said reaction taking place in a suitable solvent.

3. The process of claim 1, said basic metal carboxylate being a basic ferric carboxylate.

4. The process of claim 3, said basic ferric carboxylate selected from the group consisting of basic ferric formate, acetate, propionate, butyrate and benzoate.

5. The process of claim 4, said basic ferric carboxylate being basic ferric acetate.

6. The process of claim 1, said sulfonic acid being an alkyl sulfonic acid, the alkyl group having from 1 to about 18 carbon atoms.

7. The process of claim 1, said sulfonic acid selected from the group consisting of benzenesulfonic acid, 4-ethylbenzenesulfonic acid, 4-chlorobenzenesulfonic acid, dodecylbenzenesulfonic acid, methylsulfonic acid, perfluorooctylsulfonic acid, 4-methylbenzenesulfonic acid, and 2-naphthalenesulfonic acid.

8. The process of claim 7, said sulfonic acid selected from the group consisting of benzenesulfonic acid, 4-ethylbenzenesulfonic, 4-chlorobenzenesulfonic acid, and dodecylbenzenesulfonic acid.

9. The process of claim 7, said reaction taking place in a solvent selected from the group consisting of methanol, ethanol, acetonitrile and dioxane.

10. The process of claim 7, said basic metal carboxylate being basic ferric acetate and employing 3 equivalents of said sulfonic acid per iron atom, said reaction taking place at a temperature ranging from ambient temperature to about 40° C. in a methanol solution.

11. A process for producing electrically conductive polypyrrole which comprises:

reacting a basic metal carboxylate selected from the group consisting of basic ferric, cupric and ceric carboxylates with an effective amount of a sulfonic acid selected from the group consisting of alkyl and aryl sulfonic acids, and recovering an oxidant/dopant reagent solution containing the corresponding metal sulfonate as the oxidant/dopant, reacting said oxidant/dopant reagent solution in situ with a pyrrole, and precipitating a conductive polypyrrole solid.

12. The process of claim 11, said basic ferric carboxylate selected from the group consisting of basic ferric formate, acetate, propionate, butyrate and benzoate.

13. The process of claim 11, employing a stoichiometric amount of said sulfonic acid, said reaction taking place in a suitable solvent.

14. The process of claim 13, said basic metal carboxylate being a basic ferric carboxylate.

15. The process of claim 11, said sulfonic acid selected from the group consisting of benzenesulfonic acid, 4-ethylbenzenesulfonic acid, 4-chlorobenzenesulfonic acid, dodecylbenzenesulfonic acid, methylsulfonic acid, perfluorooctylsulfonic acid, 4-methylbenzenesulfonic acid, and 2-naphthalenesulfonic acid.

16. the process of claim 15, said basic metal carboxylate being basic ferric acetate and employing 3 equivalents of said sulfonic acid per iron atom, said reaction taking place at a temperature ranging from ambient temperature to about 40° C. in a methanol solution.

17. The process of claim 11, said pyrrole being a neat pyrrole or a pyrrole in a solvent.

18. The process of claim 11, said pyrrole selected from the group consisting of pyrrole, a 3- and 3,4-alkyl and aryl C-substituted pyrrole, an N-alkylpyrrole and an N-arylpyrrole.

19. The process of claim 18, the concentration of the oxidant/dopant in the reaction mixture containing the pyrrole ranging from about 0.01 to about 2 molar, and the concentration of the pyrrole in the reaction mixture ranging from about 0.01 to 2 molar.

20. The process of claim 19, said sulfonic acid selected from the group consisting of benzenesulfonic acid, 4-ethylbenzenesulfonic, 4-chlorobenzenesulfonic acid, and dodecylbenzenesulfonic acid, said basic metal carboxylate being basic ferric acetate and employing 3 equivalents of said sulfonic acid per iron atom, said reaction taking place at a temperature ranging from ambient temperature to about 40° C. in a methanol solution.

21. A process for producing electrically conductive polypyrrole material which comprises:

reacting a basic metal carboxylate selected from the group consisting of basic ferric, cupric and ceric carboxylates with an effective amount of a sulfonic acid selected from the group consisting of alkyl and aryl sulfonic acids, and recovering an oxidant/dopant reagent solution containing the corresponding metal sulfonate as the oxidant/dopant, contacting a porous substrate with said oxidant/dopant reagent solution,
drying said substrate,
contacting said substrate with a pyrrole, and
oxidizing said pyrrole to polypyrrole on said substrate.

22. The process of claim 21, employing a stoichiometric amount of said sulfonic acid, said reaction taking place in a suitable solvent.

23. The process of claim 22, said basic metal carboxylate being a basic ferric carboxylate.

24. The process of claim 21, said sulfonic acid selected from the group consisting of benzenesulfonic acid, 4-ethylbenzenesulfonic acid, 4-chlorobenzenesulfonic acid, dodecylbenzenesulfonic acid, methylsulfonic acid, perfluorooctylsulfonic acid, 4-methylbenzenesulfonic acid, and 2-naphthalenesulfonic acid.

25. The process of claim 24, said basic metal carboxylate being basic ferric acetate and employing 3 equivalents of said sulfonic acid per iron atom, said reaction taking place at a temperature ranging from ambient temperature to about 40° C. in a methanol solution.

26. The process of claim 21, said pyrrole being a liquid pyrrole or a pyrrole in vapor form.

27. The process of claim 21, said pyrrole monomer selected from the group consisting of pyrrole, a 3- and 3,4-alkyl and aryl C-substituted pyrrole, an N-alkylpyrrole and an N-arylpyrrole.

28. The process of claim 27, said pyrrole contained in a solvent selected from the group consisting of cyclohexane, alcohols, dioxane, acetonitrile and water.

29. A process for producing electrically conductive polypyrrole material which comprises:
reacting a basic metal carboxylate selected from the group consisting of basic ferric, cupric and ceric carboxylates with an effective amount of a sulfonic acid selected from the group consisting of alkyl and aryl sulfonic acids, and recovering an oxidant/dopant reagent solution containing the corresponding metal sulfonate as the oxidant/dopant,
contacting a porous substrate with a pyrrole,
drying said substrate,
contacting said substrate with said oxidant/dopant reagent solution, and
oxidizing said pyrrole to polypyrrole on said substrate.

30. The process of claim 29, said sulfonic acid selected from the group consisting of benzenesulfonic acid, 4-ethylbenzenesulfonic acid, 4-chlorobenzenesulfonic acid, dodecylbenzenesulfonic acid, methylsulfonic acid, perfluorooctylsulfonic acid, 4-methylbenzenesulfonic acid, and 2-naphthalenesulfonic acid.

31. The process of claim 30, said basic metal carboxylate being basic ferric acetate and employing 3 equivalents of said sulfonic acid per iron atom, said reaction taking place at a temperature ranging from ambient temperature to about 40° C. in a methanol solution.

32. The process of claim 31, said pyrrole monomer selected from the group consisting of pyrrole, a 3- and 3,4-alkyl and aryl C-substituted pyrrole, an N-alkylpyrrole and an N-arylpyrrole.

* * * * *